United States Patent
Yang et al.

(10) Patent No.: US 11,342,825 B2
(45) Date of Patent: May 24, 2022

(54) RIGID-FLEXIBLE COUPLING HIGH-ACCURACY GALVO SCANNING MOTOR AND CONTROL METHOD THEREOF

(71) Applicant: Guangdong University of Technology, Guangzhou (CN)

(72) Inventors: Zhijun Yang, Guangzhou (CN); Shengqiang Wei, Guangzhou (CN); Hao Peng, Guangzhou (CN); Youdun Bai, Guangzhou (CN); Guanxin Huang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 290 days.

(21) Appl. No.: 16/741,777

(22) Filed: Jan. 14, 2020

(65) Prior Publication Data

US 2021/0126515 A1 Apr. 29, 2021

(51) Int. Cl.
| | |
|---|---|
| *G05B 19/29* | (2006.01) |
| *H02K 24/00* | (2006.01) |
| *H02K 11/21* | (2016.01) |
| *G05B 19/19* | (2006.01) |
| *H02K 7/08* | (2006.01) |
| *H02K 7/12* | (2006.01) |
| *H02K 21/14* | (2006.01) |

(52) U.S. Cl.
CPC ............ *H02K 24/00* (2013.01); *G05B 19/19* (2013.01); *H02K 7/083* (2013.01); *H02K 7/12* (2013.01); *H02K 11/21* (2016.01); *H02K 21/14* (2013.01); *G05B 2219/33218* (2013.01); *G05B 2219/40519* (2013.01)

(58) Field of Classification Search
CPC ........ H02K 24/00; H02K 11/21; H02K 21/14; H02K 7/083; H02K 7/12; G05B 19/19; G05B 2219/33218; G05B 2219/40519; H02P 6/10
See application file for complete search history.

(56) References Cited

U.S. PATENT DOCUMENTS

| | | | |
|---|---|---|---|
| 8,222,615 B2 * | 7/2012 | Schausberger | G01N 21/6458 250/459.1 |
| 8,233,207 B2 | 7/2012 | Hastings et al. | |
| 2009/0026177 A1 | 1/2009 | Wang et al. | |
| 2010/0013485 A1 | 1/2010 | Alumbaugh et al. | |

* cited by examiner

*Primary Examiner* — Karen Masih
(74) *Attorney, Agent, or Firm* — True Shepherd LLC; Andrew C. Cheng (57) ABSTRACT

A rigid-flexible coupling high-accuracy galvo scanning motor comprises: a stator, a rotor rotating relative to the stator, bearing seats and at least two groups of encoders. The rigid-flexible coupling bearings are installed on the rotating shaft of the rotor; each of the rigid-flexible coupling bearings comprises: a rigid bearing and a flexible hinge ring which is elastically deformable, and the flexible hinge ring is fixed in an inner ring of the rigid bearing; the at least two groups of encoders comprise: a first group of encoders and a second group of encoders; the first group of encoders is used to measure a rotation angle of the rotating shaft; and the second group of encoders is used to measure a rotation angle of the inner ring of the rigid bearing. A friction dead zone is avoided through the elastic deformation of the flexible hinge ring, thereby reducing a disturbance bandwidth.

5 Claims, 11 Drawing Sheets

RIGID-FLEXIBLE COUPLING HIGH-ACCURACY GALVO SCANNING MOTOR AND CONTROL METHOD THEREOF

CROSS-REFERENCE TO RELATED APPLICATIONS

This application claims priority to Chinese Patent Application No. 201911009952.9 with a filing date of Oct. 23, 2019. The content of the aforementioned application, including any intervening amendments thereto, is incorporated herein by reference.

TECHNICAL FIELD

The disclosure relates to the technical field of galvo scanning motors, and more particularly relates to a rigid-flexible coupling high-accuracy galvo scanning motor and a control method thereof.

BACKGROUND OF THE PRESENT INVENTION

The galvo scanning motor is widely used in the field of modern industry, especially in laser marking, laser engraving, laser drilling and stage lighting control. The laser operation of an optical path is controlled by the galvo scanning motor, which is a high-efficiency and high-accuracy processing method and proposes strict requirements for the angular displacement precision of a rotor of the galvo scanning motor. However, due to the influence of the friction between a motion pair, the actual positioning precision of the galvo scanning motor is limited. The uncertain change on the surface roughness of the motion pair in the galvo scanning motor results in the uncertain change on the amplitude of frictional resistance. In the process of starting, stopping and micro-rotation of a rotating shaft of the galvo scanning motor, the speed of the rotating shaft of the motor is relatively low, and the amplitude fluctuation of the above frictional resistance easily causes a "crawling" phenomenon in the rotating shaft of the motor. Under the effect of a closed-loop control system, a driver overcomes the frictional resistance by increasing a driving force, so as to compensate a positioning error of the rotating shaft of the galvo scanning motor. In the above compensation process, the rotating shaft of the motor experiences frequent state switching from "stationary to motion". In the "stationary to motion" process, the frictional resistance of the motion pair experiences state switching from "static friction force to dynamic friction force", and a difference between a static friction coefficient and a dynamic friction coefficient causes sudden change of the acceleration at the moment of the state switching and results in "jitter" when the rotating shaft of the galvo scanning motor approaches a final positioning location, thereby affecting the positioning precision.

How to reduce the influence of the positioning error caused by the switching of the friction states in the process of starting, stopping and micro-rotation is an important problem that affects the execution precision of the galvo scanning motor. In view of the above problem, the following solutions are proposed in the prior art:

1. An accurate friction force model is established for rotation control of driving force compensation.

2. Frictionless or low-friction motion pair design is adopted, such as structural design of an air bearing, a magnetic suspension bearing or a flexible hinge.

Due to the factors such as microscopic characteristic differences and manufacturing errors of contact surfaces of the motion pair, it is difficult to establish a highly accurate friction force model, thus a complicated compensation control method is used in a rotation control system.

The low-friction motion pair such as the air bearing or the magnetic suspension bearing is high in cost, which limits its use range. As a frictionless motion pair, the flexible hinge achieves continuous high-accuracy rotation by means of elastic deformation, but the elastic deformation range is limited, and excessive deformation causes the problems of nonlinearity and fatigue life of the system.

SUMMARY OF PRESENT INVENTION

To overcome at least one defect in the prior art, the disclosure provides a rigid-flexible coupling high-accuracy galvo scanning motor. A rotating flexible hinge is used jointly with a friction bearing motion pair to achieve high-accuracy rotation by compensating a friction dead zone of a rotating pair. A designed flexible hinge ring is used to reduce the influence of "crawling" caused by the frictional change during start, stop and micro-rotation of a rotating shaft of the galvo scanning motor on the rotation and positioning precision. The disclosure adopts the following specific technical solution.

In a first aspect, the disclosure provides a rigid-flexible coupling high-accuracy galvo scanning motor, comprising: a stator, a rotor rotating relative to the stator, bearing seats and at least two groups of encoders, wherein the rotor comprises: a rotating shaft, rigid-flexible coupling bearings and a plurality of magnets; the plurality of magnets are pasted on the rotating shaft in a form of alternate polarity; the rigid-flexible coupling bearings are installed on the rotating shaft; the bearing seats are used for positioning the rotor in the stator through the rigid-flexible coupling bearings; each of the rigid-flexible coupling bearings comprises: a rigid bearing and a flexible hinge ring which is elastically deformable, and the flexible hinge ring is fixed in an inner ring of the rigid bearing; the at least two groups of encoders comprise: a first group of encoders and a second group of encoders; the first group of encoders is used to measure a rotation angle of the rotating shaft; and the second group of encoders can be used to measure a rotation angle of the inner ring of the rigid bearing.

Further, the flexible hinge ring comprises: an inner ring of the flexible hinge ring, an outer ring of the flexible hinge ring, and flexible hinge piece sets; the inner ring of the flexible hinge ring is in close contact with the rotating shaft; the outer ring of the flexible hinge ring is in close contact with the inner ring of the rigid bearing; and the flexible hinge piece sets are annularly equidistantly distributed between the inner ring of the flexible hinge ring and the outer ring of the flexible hinge ring.

Further, the rigid-flexible coupling high-accuracy galvo scanning motor also comprises: a base and a reading head installing frame fixed to the base; the first group of encoders comprises: a first encoder encoding disk and a first encoder reading head used jointly with the first encoder encoding disk; the second group of encoders comprises: a second encoder encoding disk and a second encoder reading head used jointly with the second encoder encoding disk; the first encoder encoding disk is fixed to the rotating shaft; the first encoder reading head is fixed with the reading head installing frame; the second encoder encoding disk is fixed to the outer ring of the flexible hinge ring; and the second encoder reading head is fixed with the reading head installing frame.

Further, the flexible hinge ring is made of aluminum alloy and is manufactured by integral processing.

Further, the rigid-flexible coupling high-accuracy galvo scanning motor also comprises: a galvo scanning lens and a jacket; and the jacket fixes the galvo scanning lens to one end of the rotating shaft.

Ina second aspect, the disclosure provides a method for controlling the above rigid-flexible coupling high-accuracy galvo scanning motor, comprising the following steps:

step 1: dividing a difference of subtracting a maximum disturbance amount from a maximum torque by an equivalent inertia of the rotating shaft of the motor to obtain a maximum angular acceleration; and performing motion planning by taking the maximum angular acceleration as a constraint to obtain planned angular displacement, angular velocity, and angular acceleration;

step 2: by taking the planned angular displacement and the angular velocity as reference inputs and taking the angular displacement and the angular velocity of the rotating shaft of the galvo scanning motor as feedbacks, forming a driving actuator by the stator and the rotor of the galvo scanning motor together, and establishing a closed-loop control system of the galvo scanning motor;

step 3: detecting the angular displacement and the angular velocity of the inner ring of the rigid bearing and respectively calculating differences from the angular displacement and the angular velocity of the rotating shaft of the galvo scanning motor to obtain a displacement difference and a velocity difference therebetween;

step 4: calculating differences for the angular displacement and the angular velocity of the rotating shaft of the galvo scanning motor obtained in the step 2 and the angular displacement and the angular velocity of the motion planning; inputting the differences to a proportion and differentiation controller; conducting proportional gain amplification on the displacement difference; and then conducting differential computing on the position difference and multiplying by a proportional gain to obtain the control amount of the rotating shaft of the galvo scanning motor;

step 5: multiplying the angular displacement difference and the angular velocity difference obtained in the step 3 by the stiffness and the damping of the flexible hinge piece sets; and adding the two products to obtain the measured disturbing force of the flexible hinge piece sets;

step 6: performing notch filtering on the control amount obtained in the step 4 by taking the natural frequency of the flexible hinge piece sets as a center frequency, and then compensating the measured disturbing force obtained in the step 5 and the angular acceleration feedforward information obtained by the motion planning into the control amount;

step 7: inputting the measured disturbing force obtained in the step 5 and the control amount after notch filtering and obtained in the step 6 into an extended state observer (ESO); and estimating the disturbing information of the rotating shaft of the galvo scanning motor; and step 8: compensating the estimated value of the disturbing information obtained in the step 7 into the control amount obtained in the step 6 so as to convert the closed-loop control system of the galvo scanning motor into an undisturbed rigid platform control system.

Further, the maximum torque is calculated by multiplying a force constant of the galvo scanning motor by an effective operating current; and a method for acquiring the maximum disturbing force comprises: applying a constant driving torque (T), measuring an angular acceleration curve, taking a minimum angular acceleration value (a), and calculating the maximum disturbing force (df) through a formula of:

$$T-df=I_m*a,$$

wherein $I_m$ is the inertia of the rotating shaft of the motor.

Further, a dynamic response optimization is conducted on parameters of a rotating motion curve to avoid a resonant component by taking the vibration frequency and the damping ratio of the flexible hinge piece sets as parameters, and the steps of the dynamic response optimization are as follows:

S1: parameterizing a motion planning curve, and obtaining an amplitude of an angular displacement output response corresponding to each angular acceleration input signal on a time domain;

S2: establishing an optimization model; and

S3: obtaining an optimal motion planning curve according to optimal values of the parameters of the motion planning curve obtained in the S2.

Further, the notch filtering processing is conducted on the control amount outputted by the proportion and differentiation controller; and the disturbing force generated by the flexible hinge piece sets and the angular acceleration information of the motion planning need to be compensated in the control amount.

Compared with the prior art, the disclosure has the following beneficial effects:

1. The friction dead zone is avoided by the elastic deformation of the flexible hinge ring without using a highly accurate friction force model.
2. The rotation is compensated through the elastic deformation of the flexible hinge ring.
3. The flexible hinge ring is simple in structure and low in cost.
4. The rotation and positioning precision of the rotating shaft of the galvo scanning motor is high.
5. The disturbing information is estimated through the ESO to perform compensation control, so that the working platform is equivalent to a frictionless ideal platform. In this way, high-speed and high-accuracy motion can be realized without switching control, and control complexity is reduced.
6. The introduction of the flexible hinge sets reduces a disturbance bandwidth, makes ESO observation and compensation easier, and improves the performance of the active disturbance rejection control system.

DETAILED DESCRIPTION OF PREFERRED EMBODIMENTS

The drawings are only used for exemplary illustration, and shall not be understood as a limitation to the disclosure. To better illustrate the embodiments, some components in the drawings may be omitted, enlarged or reduced, and do not represent actual product sizes. It can be understood for those skilled in the art that some known structures and illustrations in the drawings may be omitted. The positional relationships described in the drawings are only used for exemplary illustration, and shall not be understood as a limitation to the disclosure.

Figure 1:
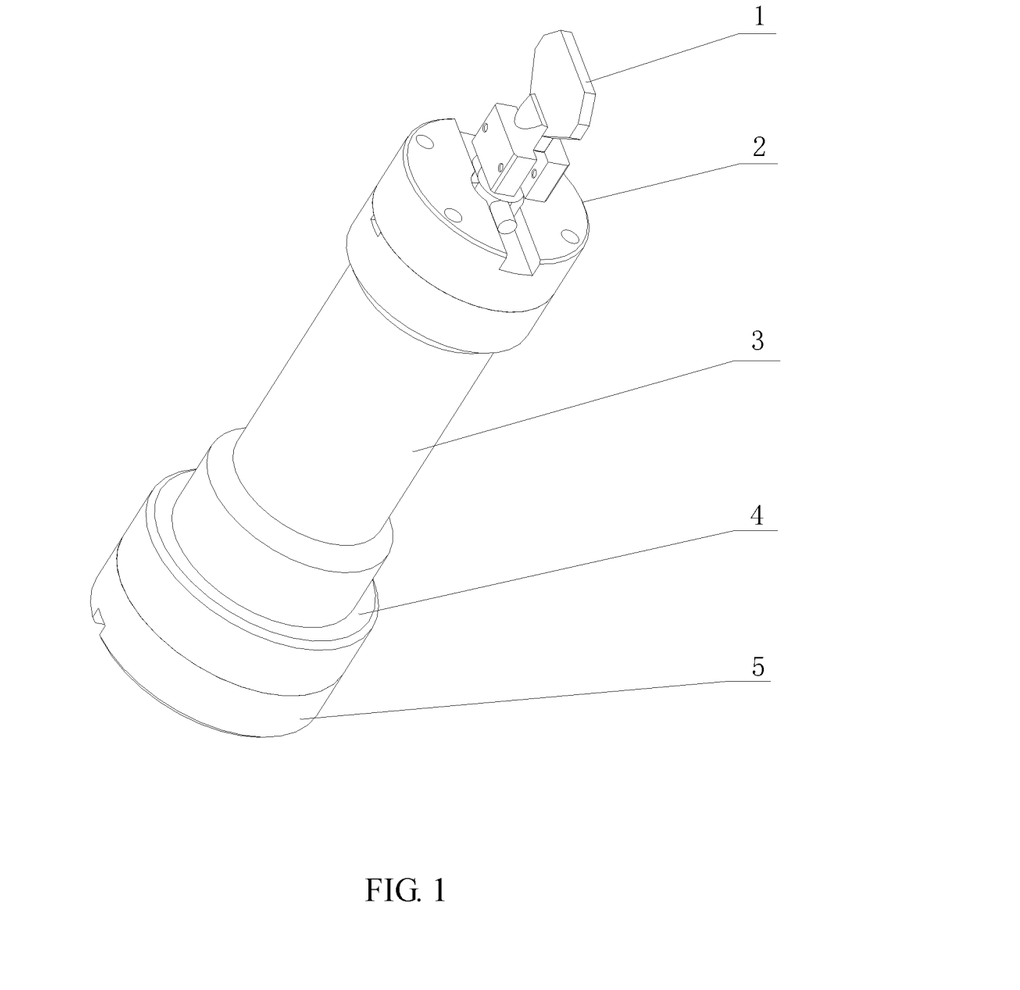
FIG. 1 is an integral structural schematic diagram showing a rigid-flexible coupling high-accuracy galvo scanning motor according to the disclosure.
Figure 2:
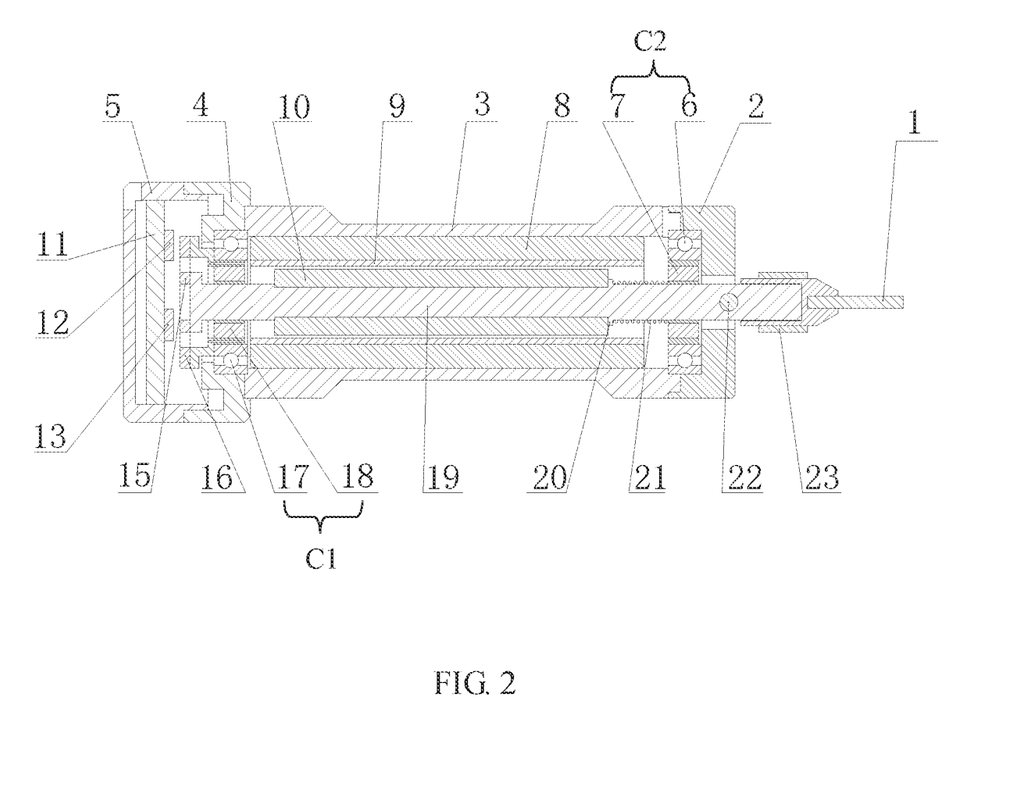
FIG. 2 is a sectional view showing the rigid-flexible coupling high-accuracy galvo scanning motor.
Figure 3:
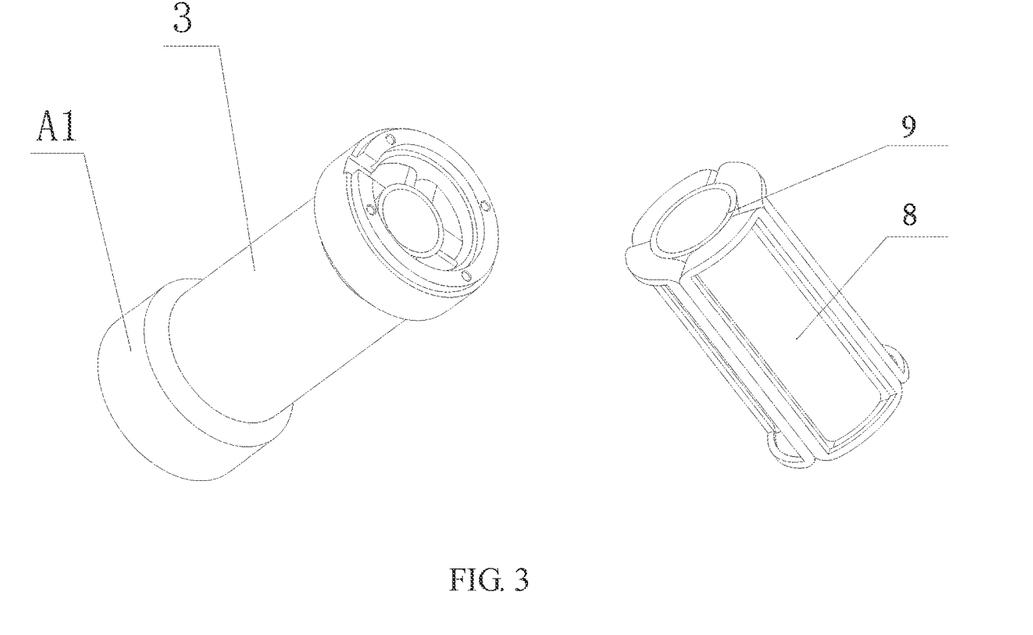
FIG. 3 is a schematic diagram showing a stator.
Figure 4:
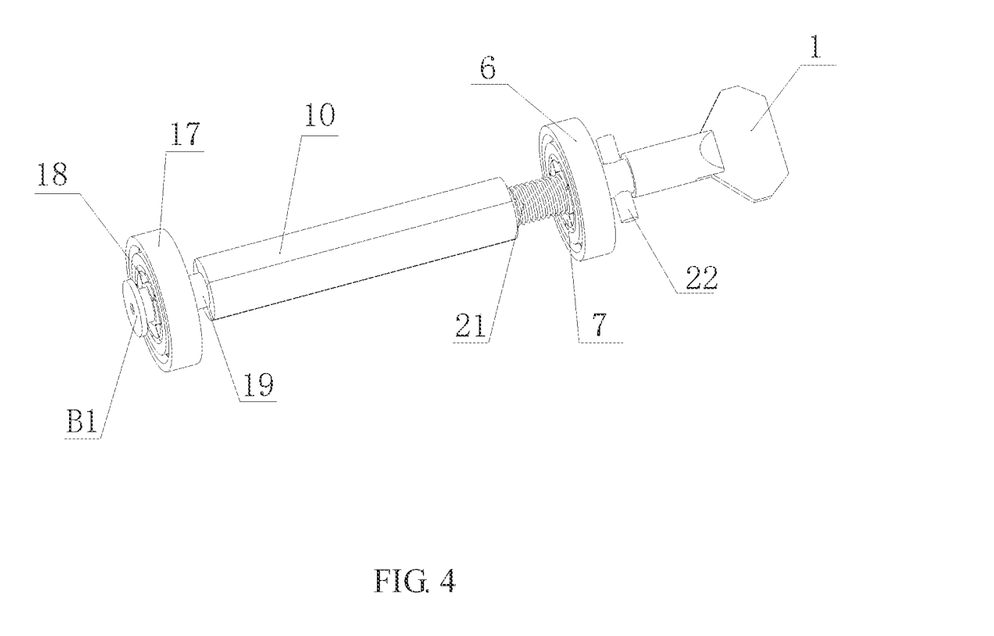
FIG. 4 is a schematic diagram showing a rotor.

As shown in FIG. 1 and FIG. 2, a rigid-flexible coupling high-accuracy galvo scanning motor proposed in the disclosure comprises: a galvo scanning lens 1, a stator A1, a rotor B1 rotating relative to the stator, bearing seats 2 and 4, a jacket 23 and at least two groups of encoders. The two groups of encoders are respectively a first group of encoders and a second group of encoders. The first group of encoders comprises: a first encoder encoding disk 15 and a first encoder reading head 12. The second group of encoders comprises: a second encoder encoding disk 16 and a second encoder reading head 13. As shown in FIG. 3, the stator A1 comprises: coils 8, a skeleton 9 and a magnet yoke 3. The skeleton 9 is a non-magnetic material provided with long grooves at intervals. The coils 8 are shaped and then placed in the long grooves of the skeleton 9, and are connected in a certain order to form a multi-stage winding. As shown in FIG. 4, the rotor B1 comprises: a rotating shaft 19, rigid-flexible coupling bearings C1, C2 and magnets 10; and the plurality of magnets 10 are pasted on the rotating shaft 19 in a form of alternate polarity to form a multi-stage rotor. A first rigid-flexible coupling bearing C1 is installed on the front end of the rotating shaft 19, and a second rigid-flexible coupling bearing C2 is installed on the rear end of the rotating shaft 19. The bearing seats 2, 4 are fixed to both ends of the stator A1. The bearing seats 2, 4 are used for accurately positioning the rotor B1 in the stator A1 through the rigid-flexible coupling bearings C1, C2. The galvo scanning lens 1 is fixed to the front end of the rotating shaft 19 through the jacket 23. A limiting stop pin 22 is arranged on a portion of the rotating shaft 19 between the galvo scanning lens 1 and the first rigid-flexible coupling bearing C1. The rotating shaft 19 is provided with a shaft shoulder 20, and a mechanical torsion spring 21 is installed on the shaft shoulder 20. One end of the mechanical torsion spring 21 is positioned on the inner side of the first rigid-flexible coupling bearing C1 to form a constant preload.

Figure 5:
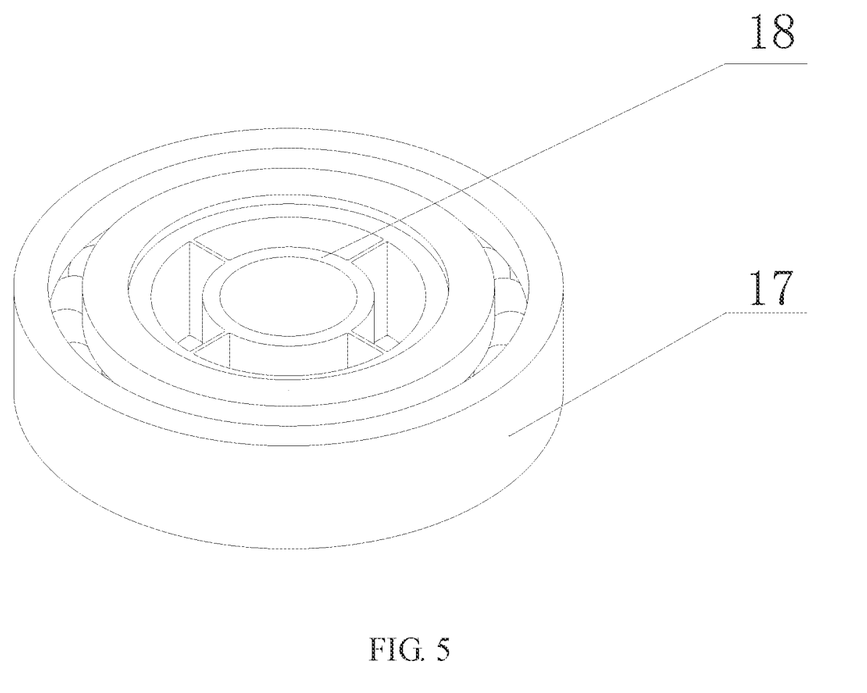
FIG. 5 is a three-dimensional schematic diagram showing a rigid-flexible coupling bearing.
Figure 6:
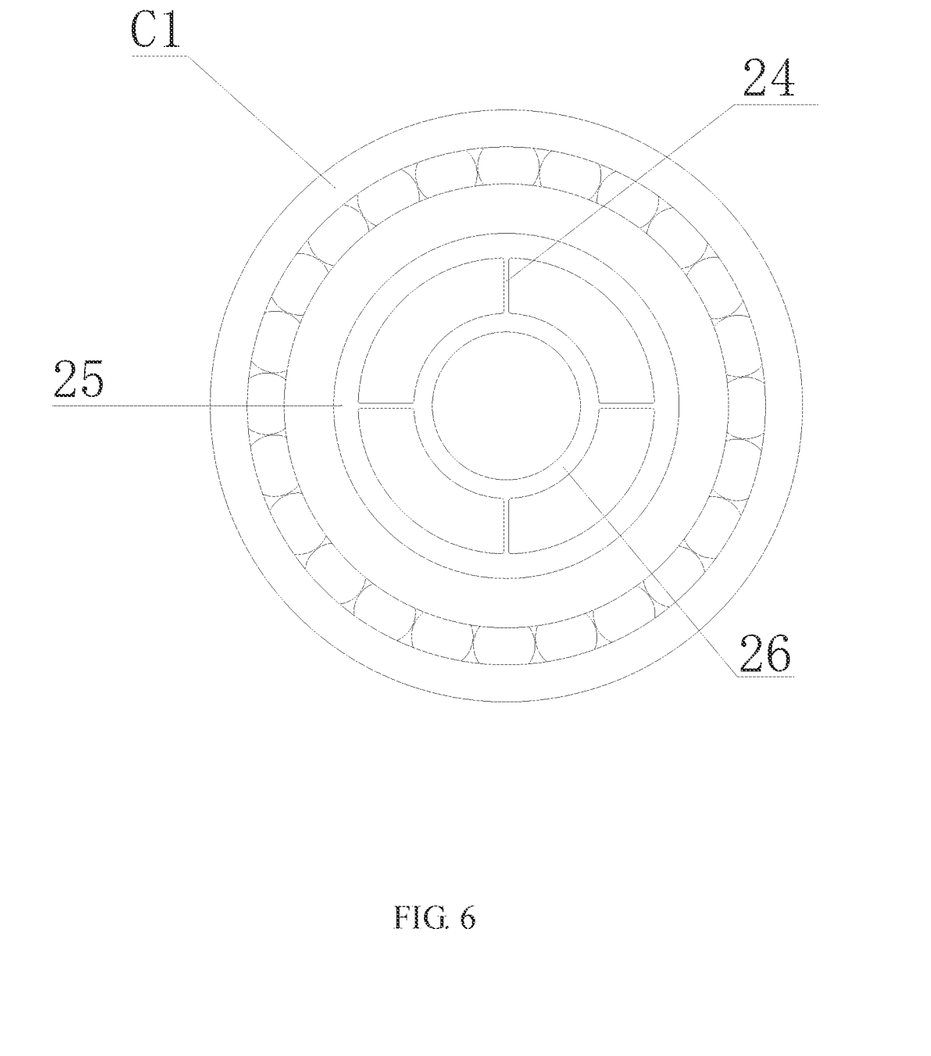
FIG. 6 is a top view showing the rigid-flexible coupling bearing.
Figure 7:
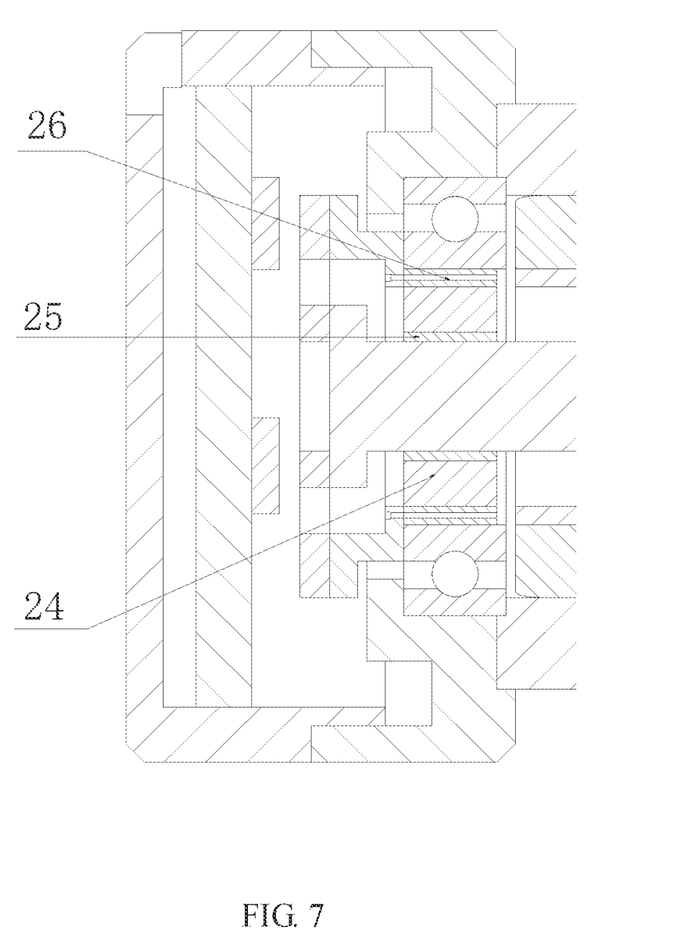
FIG. 7 is an enlarged view showing a flexible hinge ring.

As shown in FIG. 5 to FIG. 7, the first rigid-flexible coupling bearing C1 has the same structure as the second rigid-flexible coupling bearing C2. The first rigid-flexible coupling bearing C1 comprises: a rigid bearing 17 and a flexible hinge ring 18. As shown in FIG. 2, the second rigid-flexible coupling bearing C2 comprises: a rigid bearing 6 and a flexible hinge ring 7. The main working part of the rigid-flexible coupling bearing C1 is the flexible hinge ring 18; and the flexible hinge ring 18 is made of aviation aluminum material and is preferably manufactured by integral processing. The flexible hinge ring 18 comprises: an inner ring 26 of the flexible hinge ring, an outer ring 25 of the flexible hinge ring, and flexible hinge piece sets 24. The inner ring 26 of the flexible hinge ring is in close contact with the rotating shaft 19; the outer ring 25 of the flexible hinge ring is in close contact with the inner ring of the rigid bearing 17; and the flexible hinge piece sets 24 are annularly equidistantly distributed between the inner ring 26 of the flexible hinge ring and the outer ring 25 of the flexible hinge ring, wherein the outer ring 25 of the flexible hinge ring is fixed with the inner ring of the rigid bearing through interference assembly.

The rigid-flexible coupling bearing C1 has the following advantages:

1. The flexible hinge rings are arranged symmetrically.
2. The flexible hinge rings are made of aluminum alloy and are manufactured by integral processing, so that the flexible hinge rings have no assembly error.

As shown in FIG. 1 to FIG. 7, the motor rotor A1 and the motor stator B1 form a rotating driver. When the stator A1 is energized, the stator A1 interacts with the magnetic field of the rotor B1 to generate a torque, so that the rotor B1 drives the galvo scanning lens 1 to rotate in the stator A1. When alternating current is applied to the stator A1, the rotor B1 makes reciprocating rotation motion in the stator A1. The mechanical torsion spring 21 is installed on the shaft shoulder 20, and is positioned on the inner side of the first rigid-flexible coupling bearing C1 to form the constant preload. A reset torque is applied to the mechanical torsion spring, and the magnitude of the torque is in direct proportion to an angle at which the rotor deviates from an equilibrium position. When the rotor is deflected to a certain angle, an electromagnetic torque is equal to a restoring torque to drive the galvo scanning lens 1 to achieve high-speed reciprocating deflection. The upper end of the rotating shaft 19 is provided with the limiting stop pin 22 for physical limiting, so as to prevent the deflection angle of the rotating shaft 19 from being excessively large. The rotor B1 of the galvo scanning motor applies a driving force to the rotating shaft 19 under the action of the electromagnetic force. The driving force can elastically deform the flexible hinge ring 18 and further cause the rotating shaft 19 to generate an angular displacement about a central axis direction. The elastic deformation reaction force of the flexible hinge ring 18 can be used to overcome the friction force of the motion pair connected with the rigid rotating shaft 19. When the elastic deformation reaction force of the flexible hinge ring 18 is greater than resistance such as static friction force of the motion pair connected with the rotating shaft 19, the rotating shaft 19 is changed from a stationary state to a motion state.

The rotation of the rigid-flexible coupling high-accuracy galvo scanning motor includes two conditions: a. when the elastic deformation force of the flexible hinge ring 18 is less than the resistance such as static friction force of the motion pair, the rotation amount of the rotating shaft 19 is the elastic deformation amount of the motion pair of the flexible hinge ring 18; and b. when the elastic deformation force of the flexible hinge ring 18 is greater than the resistance such as static friction force of the motion pair, the rotation amount of the rotating shaft 19 is a superposition of the elastic deformation amount of the motion pair of the flexible hinge ring 18 and the rotation amount of the bearing. When the motion state of the motion pair connected with the rotating shaft 19 is switched between the above a and b conditions, a difference between the static friction coefficient and the dynamic friction coefficient of the motion pair connected with the rotating shaft 19 causes sudden change of the resistance, thereby generating a rigid impact on the rotating shaft 19 of the motor and causing the friction "crawling" of the motion pair. The flexible hinge ring 18 can actively adapt to the sudden change of the frictional resistance caused by the switching of the friction state of the motion pair by virtue of own elastic deformation, so as to alleviate the rigid impact of the sudden change of the frictional resistance on the rotating shaft 19 of the galvo scanning motor. Under either condition, the rotating shaft 19 of the motor can achieve continuous rotation change by virtue of the elastic deformation of the flexible hinge ring 18 to avoid the influence of the friction "crawling" condition on the rotation and positioning precision.

Figure 8:
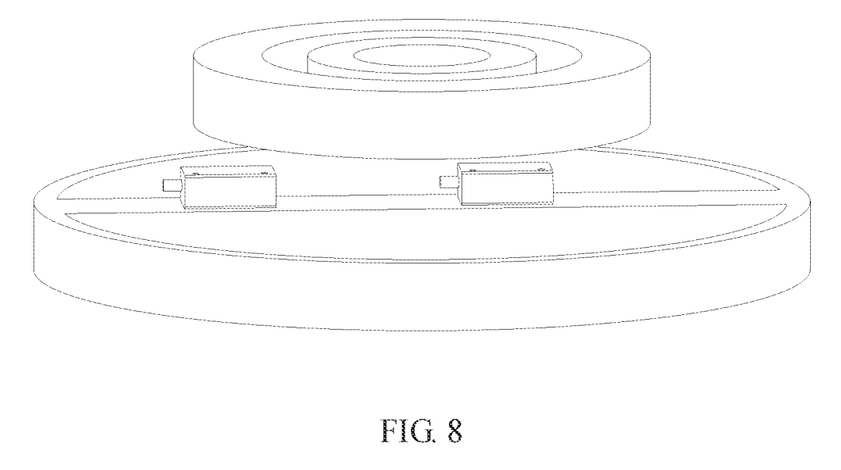
FIG. 8 is a three-dimensional schematic diagram showing an encoder.
Figure 9:
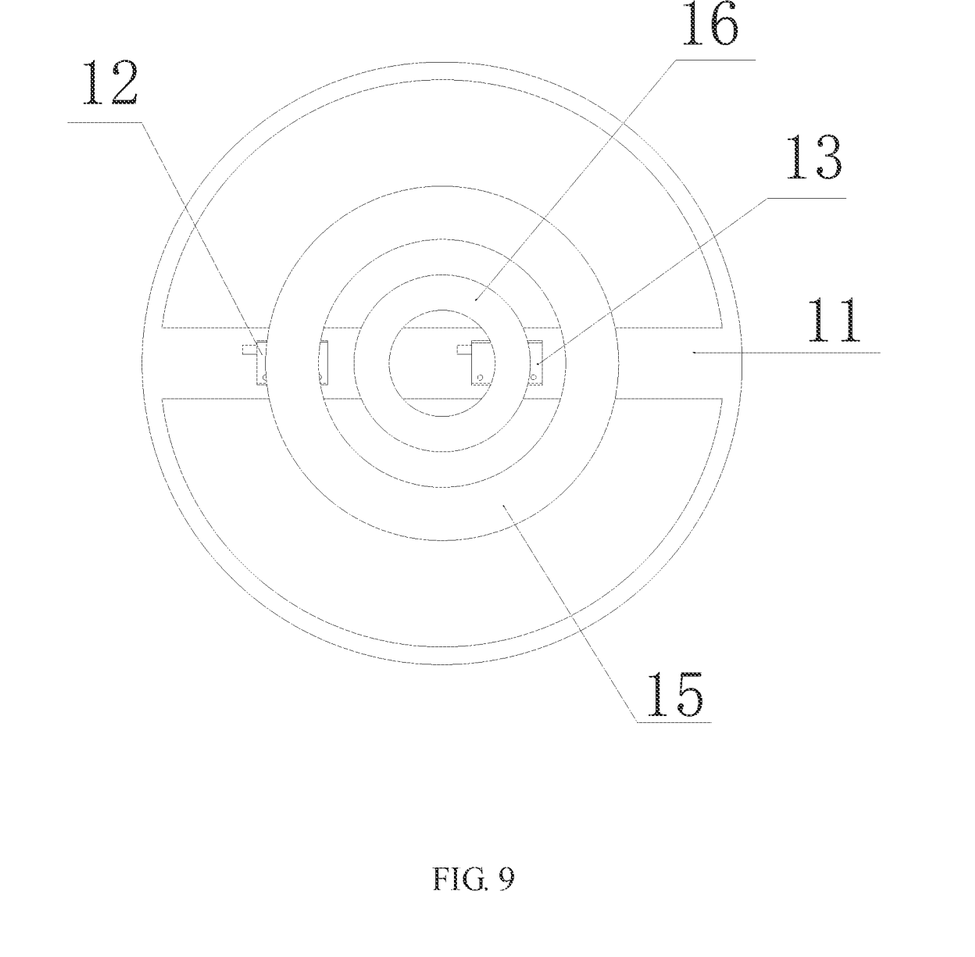
FIG. 9 is a top view showing the encoder.

As shown in FIG. 2, FIG. 8 and FIG. 9, the rigid-flexible coupling high-accuracy galvo scanning motor also comprises a base 5 and a reading head installing frame 11. The reading head installing frame 11 is fixed to the base 5. The first encoder encoding disk 15 is fixed to the rotating shaft 19 of the motor by screws. Therefore, the first encoder encoding disk 15 rotates synchronously with the rotating shaft 19. The first encoder reading head 12 used jointly with the first encoder encoding disk 15 is fixed with the reading head installing frame 11 through screw connection. Therefore, the first group of encoders can measure the rotation angle of the rotating shaft 19 of the galvo scanning motor under any condition in real time. Meanwhile, a second encoder encoding disk 16 and a second encoder reading head 13 form a second group of encoders. The second encoder encoding disk 16 is fixed to the outer ring 25 of the flexible hinge ring; and the outer ring 25 of the flexible hinge ring is fixed with the inner ring of the rigid bearing through interference assembly. Therefore, the second encoder encoding disk 16 rotates synchronously with the outer ring 25 of the flexible hinge ring. The second encoder reading head 13 used jointly with the second encoder encoding disk 16 is fixed with the reading head installing frame 11 through screw connection. The reading head installing frame is fixed to the base 5. Therefore, the second group of encoders can measure the rotation angle of the outer ring 25 of the flexible hinge ring under any condition. Since the outer ring 25 of the flexible hinge ring is fixed with the inner ring of the rigid bearing, the rotation angle of the inner ring of the rigid bearing is measured. Through the measured data of the two groups of encoders, the elastic deformation amount of the flexible hinge ring 18 can be indirectly measured, and the unmeasurable friction force is converted into the elastic deformation amount of the measurable flexible hinge ring 18. The rotation angle data of the rotation angle measurement of the two groups of encoders can be used as a feedback link to form a closed-loop control system with the rotating driver to realize high-accuracy rotation and positioning of the rotating shaft 19 of the galvo scanning motor.

In conclusion, the realizing method of the rigid-flexible coupling high-accuracy galvo scanning motor mainly comprises the following steps:

1. The rotating driver directly drives the rotating shaft of the motor. When the driving force fails to overcome the static friction of the motion pair, the rotating shaft of the galvo scanning motor generates a slight rotation by the elastic deformation of the flexible hinge ring in the rigid-flexible coupling bearing, thereby realizing precise micro-rotation.

2. When the driving force overcomes the static friction force, the flexible hinge ring drives the rigid bearing to move; at this moment, the elastic deformation is increased to a certain extent and enters a limiting state; and all the driving forces are transmitted to the rigid bearing for high-speed motion.

3. When the motor brakes, the rotating shaft brakes at first, and the flexible hinge ring drives the rigid bearing to brake, thereby attenuating the vibration energy.

From the above, the rigid-flexible coupling high-accuracy galvo scanning motor of the disclosure has the advantages:

1. A frictionless flexible hinge ring motion pair is used to realize high-accuracy continuous varying rotation, thereby avoiding the rotation "jitter" caused by sudden change of the acceleration caused by the switching of the friction state of the motion pair under low speed conditions.

2. Rigid-flexible coupling bearing design is adopted, i.e., a flexible hinge ring is installed on the inner side of the inner ring of the rigid bearing. The used flexible hinge ring can actively adapt to the frictional change of the motion pair by virtue of the own elastic deformation, thereby avoiding the influence of the "crawling" caused by the switching of the friction state of the motion pair on the continuous rotation and positioning and benefiting higher positioning precision.

3. The rotating platform design of dual encoders is used to convert the unmeasurable friction force into the measurable elastic deformation amount of a composite flexible hinge ring; and the obtained data feedback can achieve more precise control compensation.

Based on the above rigid-flexible coupling high-accuracy galvo scanning motor, the disclosure also proposes a method for controlling the rigid-flexible coupling high-accuracy galvo scanning motor through dual feedbacks.

To solve the disturbance to a control signal by the low-frequency vibration of the flexible hinge, the control signal is separated into three kinds of control amounts: feedforward, flexible hinge disturbing force and speed displacement deviation correction, wherein the feedforward is in direct proportion to the acceleration of the motion planning. The disturbing force of the flexible hinge piece sets is obtained by double feedback measurement and ESO estimation. The angular velocity and the angular displacement deviation are obtained by the proportion and differentiation controller. When the motion planning is reasonable, the equivalent dynamic model of the rotor of the galvo scanning motor is a frictionless ideal rigid body, and the control force is mainly an action force of the feedforward and the flexible hinge piece sets. The angular velocity displacement deviation is mainly caused by the elastic deformation of the flexible hinge piece sets. The main frequency component is the natural frequency of the flexible hinge piece sets, which can be filtered by notch filtering. Since the ESO has a filtering function, after the above three control signals are superimposed, no resonant component exists.

Figure 10:
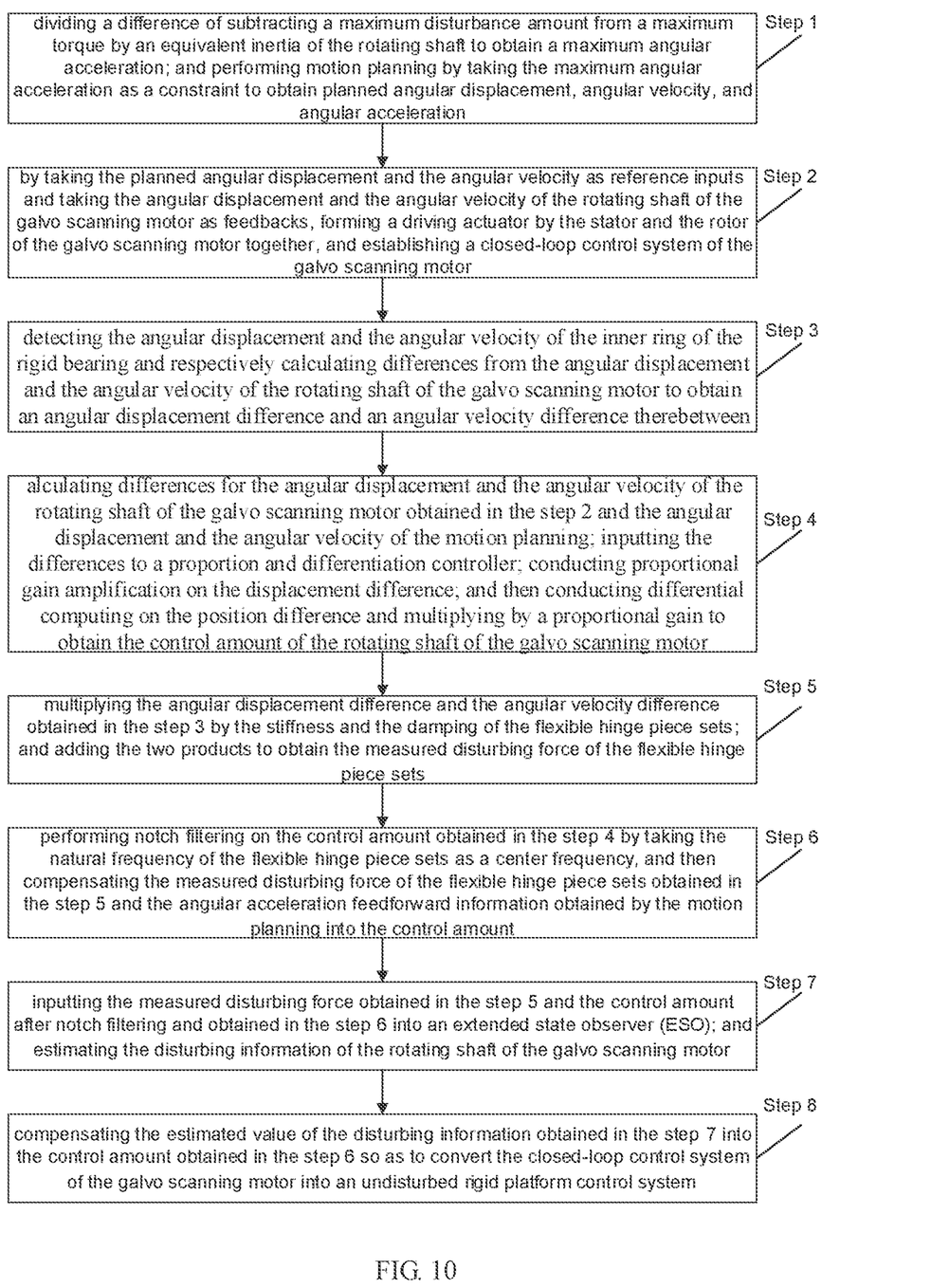
FIG. 10 is a flow chart showing a method for controlling the rigid-flexible coupling high-accuracy galvo scanning motor.
Figure 11:
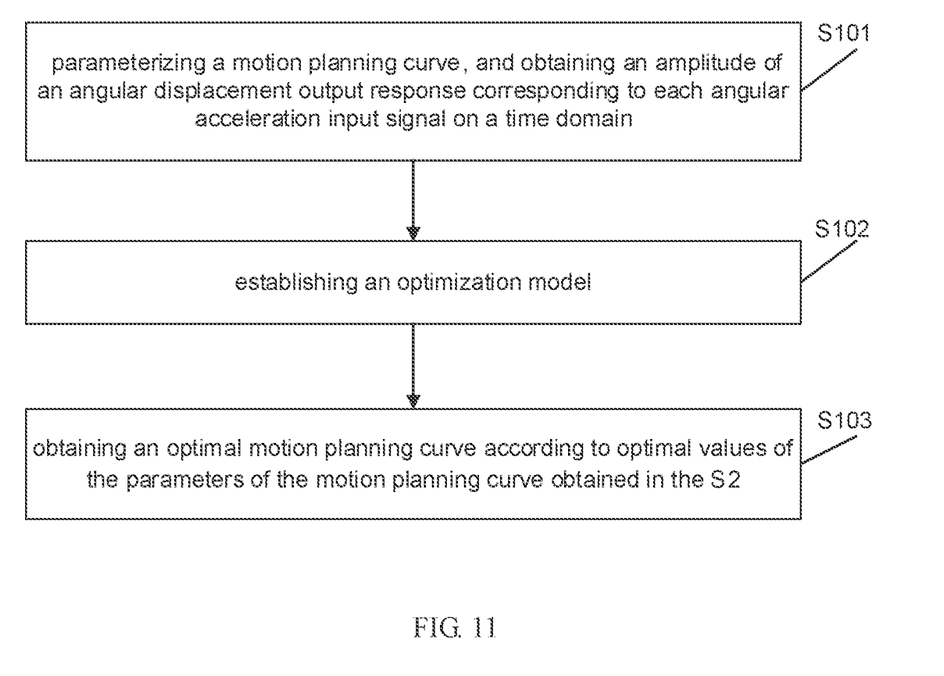
FIG. 11 is a flow chart showing dynamic response optimization.

Through abovementioned method, the dynamic response equation of the platform is equivalently converted into an ideal undisturbed form, thereby avoiding the cumbersome and complicated model switching control and realizing high-speed precision motion. As shown in FIGS. 10 and 11, the specific control method comprises:

Step 1: dividing a difference of subtracting a maximum disturbance amount from a maximum torque by an equivalent inertia of the rotating shaft of the motor to obtain a maximum angular acceleration; and performing motion planning by taking the maximum angular acceleration as a constraint to obtain planned angular displacement, angular velocity, and angular acceleration, wherein the maximum torque is calculated by multiplying a force constant of the galvo scanning motor by an effective operating current; and a method for acquiring the maximum disturbing force comprises: applying a constant driving torque T, measuring an angular acceleration curve, taking a minimum angular acceleration value a, and calculating the maximum disturbing force df through a formula of:

$$T - df = I_m * a;$$

wherein $I_m$ is the inertia of the rotating shaft of the motor.

Specifically, a dynamic response optimization is conducted on parameters of a rotating motion curve to avoid a resonant component by taking the vibration frequency and the damping ratio of the flexible hinge piece sets as parameters, and the steps of the dynamic response optimization are as follows:

S101: parameterizing a motion planning curve, and obtaining an amplitude of an angular displacement output response corresponding to each angular acceleration input signal on a time domain;

S102: establishing an optimization model; and

S103: obtaining an optimal motion planning curve according to optimal values of the parameters of the motion planning curve obtained in the S2.

Step 2: by taking the planned angular displacement and the angular velocity as reference inputs and taking the angular displacement and the angular velocity of the rotating shaft of the galvo scanning motor as feedbacks, forming a driving actuator by the stator and the rotor of the galvo scanning motor together, and establishing a closed-loop control system of the galvo scanning motor;

Step 3: detecting the angular displacement and the angular velocity of the inner ring of the rigid bearing and respectively calculating differences from the angular displacement and the angular velocity of the rotating shaft of the galvo scanning motor to obtain a displacement difference and a velocity difference therebetween;

Step 4: calculating differences for the angular displacement and the angular velocity of the rotating shaft of the galvo scanning motor obtained in the step 2 and the angular displacement and the angular velocity of the motion planning; inputting the differences to a proportion and differentiation controller; conducting proportional gain amplification on the displacement difference; and then conducting differential computing on the position difference and multiplying by a proportional gain to obtain the control amount of the rotating shaft of the galvo scanning motor.

Preferably, the notch filtering processing is conducted on the control amount outputted by the proportion and differentiation controller; and the disturbing force generated by the flexible hinge piece sets and the angular acceleration information of the motion planning need to be compensated in the control amount.

Step 5: multiplying the angular displacement difference and the angular velocity difference obtained in the step 3 by the stiffness and the damping of the flexible hinge piece sets; and adding the two products to obtain the measured disturbing force of the flexible hinge piece sets;

Step 6: performing notch filtering on the control amount obtained in the step 4 by taking the natural frequency of the flexible hinge piece sets as a center frequency, and then compensating the measured disturbing force obtained in the step 5 and the angular acceleration feedforward information obtained by the motion planning into the control amount;

Step 7: inputting the measured disturbing force obtained in the step 5 and the control amount after notch filtering and obtained in the step 6 into an extended state observer (ESO); and estimating the disturbing information of the rotating shaft of the galvo scanning motor;

Step 8: compensating the estimated value of the disturbing information obtained in the step 7 into the control amount obtained in the step 6 so as to convert the closed-loop control system of the galvo scanning motor into an undisturbed rigid platform control system.

The control method proposed by the disclosure uses two groups of encoders to convert the unmeasurable friction force into the measurable elastic deformation of the flexible hinge ring, feeds back the measured elastic deformation data to the control system, and realizes more precise compensation in control and higher rotation and positioning precision. However, due to the introduction of the flexible hinges, the bandwidth of the system is reduced, causing low frequency vibration of the system. If the traditional PID control is used, the control signal after amplified by the controller is fluctuated more greatly, which further aggravates the vibration of the system and affects the control precision. If the control signal is directly filtered, the information of the motion command is filtered out at the same time of filtering out the disturbance of the flexible hinges, i.e., the control signal is out of function. In addition, to protect the driver, the control amount that enters the driver is generally limited to avoid exceeding a control amount limit, causing that the capability of the driver is limited without reaching the maximum when the disturbance is increased. Thus, the disturbance is not completely offset. Moreover, since the control laws of the rotating shaft of the motor are inconsistent in the process of high-speed rotation and micro-motion compensation, the model needs to be switched for control, thereby causing a complicated control process.

In the control method of the disclosure, the disturbing information is estimated through the ESO to perform compensation control, so that a working platform is equivalent to a frictionless ideal platform. In this way, high-speed precision motion can be realized without switching control, and control complexity is reduced.

The technical features of the above embodiments can be combined in any way. For the brevity of illustration, all possible combinations of the technical features in the above embodiments are not described. However, as long as the combinations of the technical features do not conflict, the combinations shall be considered as the scope of this description.

Apparently, the above embodiments of the disclosure are merely examples for clearly describing the disclosure, not limitations to the embodiments of the disclosure. Other variations or modifications of different forms can also be made by those ordinary skilled in the art based on the above illustration. There is no need and no way to exhaust all of the embodiments. Any modification, equivalent substitution and improvement made within the spirit and principle of the disclosure shall be included within the protection scope of claims of the disclosure.

We claim:

1. A rigid-flexible coupling high-accuracy galvo scanning motor, comprising: a stator, a rotor rotating relative to the stator, bearing seats and at least two groups of encoders, wherein the rotor comprises: a rotating shaft, rigid-flexible coupling bearings and a plurality of magnets;

the plurality of magnets are pasted on the rotating shaft in a form of alternate polarity;

the rigid-flexible coupling bearings are installed on the rotating shaft;

the bearing seats are used for positioning the rotor in the stator through the rigid-flexible coupling bearings;

each of the rigid-flexible coupling bearings comprises: a rigid bearing and a flexible hinge ring which is elastically deformable, and the flexible hinge ring is fixed in an inner ring of the rigid bearing;

the at least two groups of encoders comprise: a first group of encoders and a second group of encoders;

the first group of encoders is used to measure a rotation angle of the rotating shaft; and the second group of encoders is used to measure a rotation angle of the inner ring of the rigid bearing.

2. The motor according to claim 1, wherein the flexible hinge ring comprises: an inner ring of the flexible hinge ring, an outer ring of the flexible hinge ring, and flexible hinge piece sets;

the inner ring of the flexible hinge ring is in close contact with the rotating shaft; the outer ring of the flexible hinge ring is in close contact with the inner ring of the rigid bearing; and the flexible hinge piece sets are annularly equidistantly distributed between the inner ring of the flexible hinge ring and the outer ring of the flexible hinge ring.

3. The motor according to claim 2, further comprising: a base and a reading head installing frame fixed to the base;

the first group of encoders comprises: a first encoder encoding disk and a first encoder reading head used jointly with the first encoder encoding disk;

the second group of encoders comprises: a second encoder encoding disk and a second encoder reading head used jointly with the second encoder encoding disk;

the first encoder encoding disk is fixed to the rotating shaft;

the first encoder reading head is fixed with the reading head installing frame;

the second encoder encoding disk is fixed to the outer ring of the flexible hinge ring; and the second encoder reading head is fixed with the reading head installing frame.

4. The motor according to claim 2, wherein the flexible hinge ring is made of aluminum alloy and is manufactured by integral processing.

5. The motor according to claim 1, further comprising: a galvo scanning lens and a jacket; and the jacket fixes the galvo scanning lens to one end of the rotating shaft.

* * * * *